United States Patent [19]
Kashima et al.

[11] Patent Number: 5,406,421
[45] Date of Patent: Apr. 11, 1995

[54] COVER SLIP FOR USE IN MICROSCOPE

[75] Inventors: Shingo Kashima; Asako Kashima, both of Sagamihara, Japan

[73] Assignee: Olympus Optical Co., Ltd., Tokyo, Japan

[21] Appl. No.: 185,759

[22] Filed: Jan. 24, 1994

Related U.S. Application Data

[63] Continuation-in-part of Ser. No. 7,752, Jan. 22, 1993.

[30] Foreign Application Priority Data

Jan. 31, 1992 [JP] Japan .................. 4-009536 U

[51] Int. Cl.6 .................................................. G02B 5/00
[52] U.S. Cl. ........................................ 359/894; 359/511
[58] Field of Search ............. 359/511, 512, 600, 894, 359/895

[56] References Cited
U.S. PATENT DOCUMENTS

| | | | |
|---|---|---|---|
| 3,611,970 | 10/1971 | Hagan | 359/894 |
| 3,788,730 | 1/1974 | Greenleaf | 359/894 |
| 3,796,477 | 3/1974 | Geraci | 359/600 |
| 3,976,369 | 8/1976 | McCardell et al. | 359/894 |

FOREIGN PATENT DOCUMENTS

| | | | |
|---|---|---|---|
| 2210442 | 9/1973 | Germany . | |
| 2655041 | 6/1978 | Germany . | |
| 0248196 | 7/1987 | Germany | 359/512 |
| 56-50312 | 5/1981 | Japan . | |

*Primary Examiner*—Edward K. Look
*Assistant Examiner*—Mark Sgantzos
*Attorney, Agent, or Firm*—Frishauf, Holtz, Goodman & Woodward

[57] ABSTRACT

A cover slip for use in a microscope, which is employed for a water-immersed objective lens, is made of a transparent material with a refractive index, the difference between the refractive index of the transparent material and that of water being 0.02 or less.

2 Claims, 3 Drawing Sheets

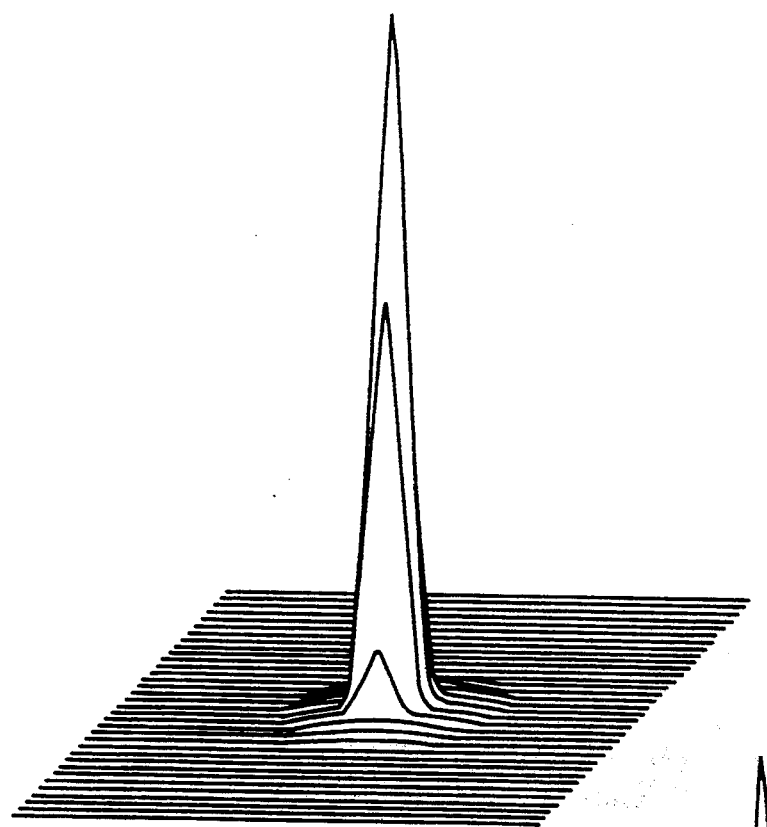
0.0007962 MM
F I G. 2
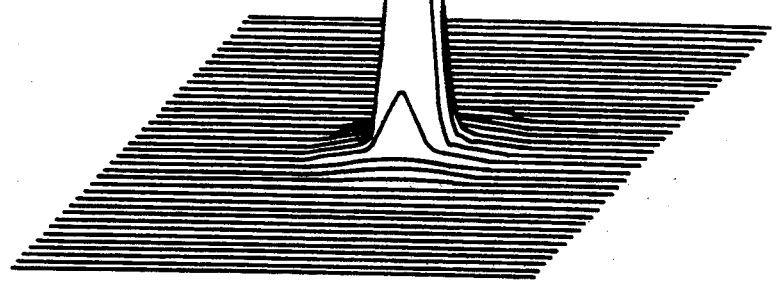
0.0007962 MM
F I G. 3

0.0007885 MM 0.0007885 MM

COVER SLIP FOR USE IN MICROSCOPE

This application is a Continuation-In-Part of application Ser. No. 08/007,752, filed Jan. 22, 1993.

BACKGROUND OF THE INVENTION

1. Field of the Invention

This invention relates to a cover slip for use in a microscope, suitable for observing a biological sample by use of a water-immersed objective lens, in particular, with a high power and a high numerical aperture.

2. Description of the Related Art

Recently, three-dimensional structural analysis of a cytoskeleton or a chromosome by use of a laser scanning microscope (LSM) with high contrast and resolution, or locally detection of a fluorescent substance in a cell by use of a fluorescent antibody method using an LSM, have attracted great public attention as regards basic research of biological and medical. The greatest merit of the LSM is that a sample is optically sliced by a confocal optical system so as to obtain a three-dimensional image. When optical slicing is performed, not only a surface portion but also an interior portion of the sample must be observed. Hence, observation of the sample is carried out through a cover slip and the sample itself in the case of a standard microscope, and often through a thin layer of culture solution in the case of an inverted microscope.

Observation of the interior of a sample (e.g. a cell) through a culture solution by use of a conventional oil-immersed objective lens can considerably deteriorate the focusing accuracy, since the refractive index of the sample and the culture solution are substantially equal to that (1.33) of water and greatly differs from the refractive index (1.515) of the immersion oil. In fact, when the optical slicing is performed using an oil-immersed objective lens with a numerical aperture of approx. 1.4, a good image cannot be obtained from a portion of the sample located deeper than about 30 μm below its surface. On the other hand, a water-immersed objective lens having a refractive index which does not greatly differ from that of the sample and the culture solution is used, the deterioration of the focusing accuracy is small, so that a good image of the optical slicing from a portion located as deep as possible within the working Distance (WD) can be obtained.

However, the material of the conventional cover slip is selected to have a refractive index (1.521) according to the refractive index of the immersion oil. Accordingly, if the cover slip is used in combination with the water-immersed objective lens, an error in the thickness of the cover slip will deteriorate the focusing accuracy of the objective lens because of the difference of refractive index (0.191) between the cover slip and water of the objective lens. An error in the thickness of the cover slip is generally about ±0.02 mm based on current manufacturing techniques and costs. This amount of error greatly deteriorates the focusing accuracy of the objective lens which has a high power and a high numerical aperture.

Published Unexamined Japanese Patent Application No. 56-50312 and German Patent No. 2655041 disclose techniques developed in light of the above-described disadvantage. The Japanese application discloses use of an acrylate resin as the material of a cover slip for use in a microscope. The acrylate resin has a refractive index of approx. 1.5, which is still much greater than that of water, and hence has the same defect as the material used to form a standard cover slip. On the other hand, the German patent discloses a technique for displacing, along the optical axis, a particular lens component in a microscope objective lens in accordance with an error in the thickness of the cover slip, so as to compensate for deterioration in focusing accuracy. Use of this technique, however, makes it difficult to design the objective lens, and to adjust the lens position to one at which deterioration in focusing accuracy is minimized.

SUMMARY OF THE INVENTION

It is the object of the invention to provide a cover slip for use in a microscope, which can minimize deterioration in the focusing accuracy of the microscope when a biological sample is observed by use of a water-immersed objective lens—in particular, one with a high power and a high numerical aperture.

The cover slip of the invention is characterized in that it is made of a transparent material having a refractive index which is lower or higher than that of water by 0.02 or less.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 2 shows the intensity distribution of a dot image obtained by the objective lens of FIG. 1 when a cover slip made of Cytop and having a thickness of 0.17 mm is combined with the objective lens;

FIG. 3 shows the intensity distribution of a dot image obtained by the objective lens of FIG. 1 when a cover slip made of Cytop and having a thickness of 0.19 mm is combined with the objective lens;

DETAILED DESCRIPTION OF THE PREFERRED EMBODIMENT

Figure 1:
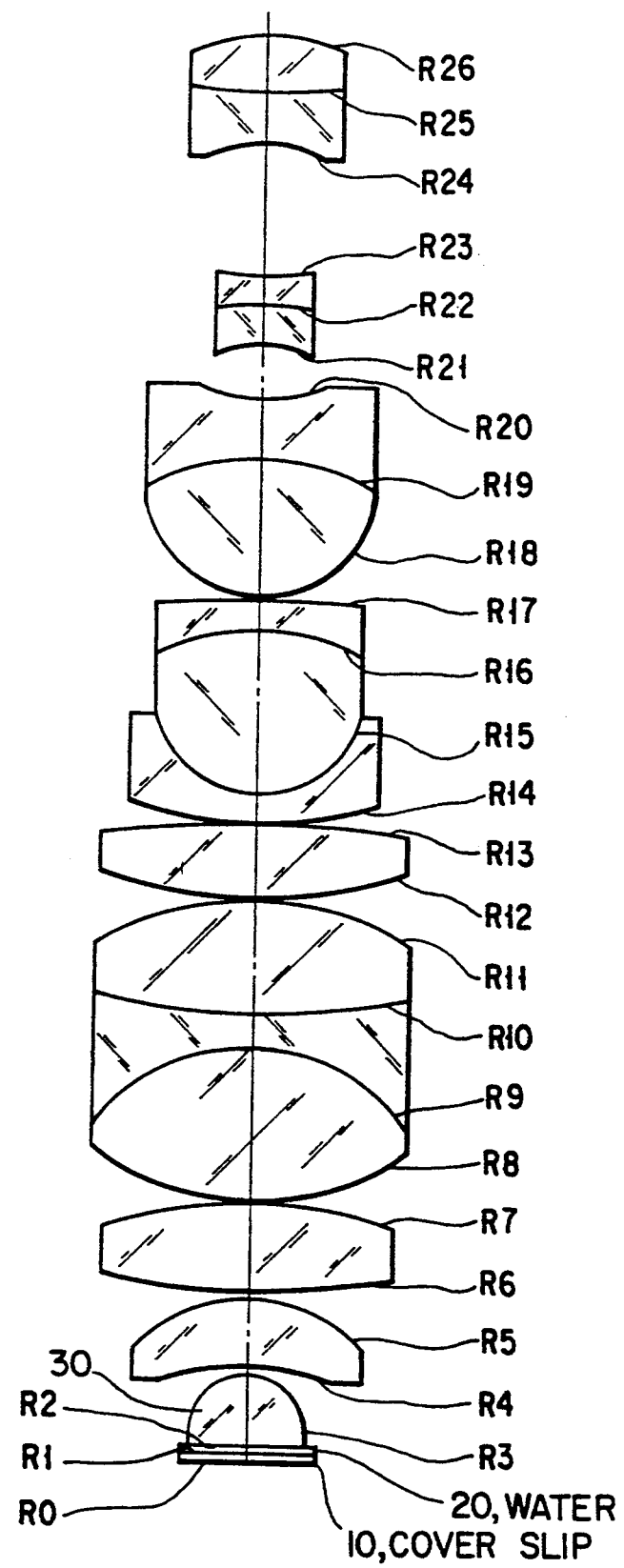
FIG. 1 is a cross sectional view, showing a microscope objective lens.

A cover slip 10 (FIG.1) according to an embodiment of the invention is a plate member made of a transparent material and having a thickness of 0.17 mm, which is identical to the thickness of a general cover glass. For example, a transparent fluorocarbon resin produced by Asahi Glass Co., Ltd. (Trade name: Cytop; Refractive index: 1.34; Abbe number: 90) is suitable for the cover slip.

Since the refractive index of Cytop is 1.34 and substantially identical to that of water, a cover slip 10 made of Cytop is almost free from deterioration in focusing accuracy because of a change in thickness or degraded profile irregularity. Further, since Cytop has a water absorption degree much lower than PMMA (polymethylmethacrylate) and the like, it exhibits only a small change in characteristics even if it contacts water at all times. Moreover, since Cytop is a resin which is soluble in a particular solvent, it has superior working properties, and hence it can easily be shaped not only like the conventional cover slip but also like a Petri dish for use in an inverted microscope. In addition, since Cytop has a UV transmittance much higher than the conventional cover slip, it can be employed in a scanning laser microscope to observe a UV fluorescence.

In the disclosed embodiment, Cytop, a transparent fluorocarbon resin, is used as the material of the cover slip 10. Then, the focusing accuracy of a microscope will be described, which is obtained when the cover slip made of Cytop is located across the optical path on that side of the water-immersed objective lens 30 of FIG. 1 which is close to a sample.

Objective Lens Data Items

Numerical aperture: 1.25, Overall focal distance: 1.8, Image position: Infinite-point, Power: 100×, correction.

| | | |
|---|---|---|
| $R_0$ = (OBJECT SURFACE) | $D_0$ = 0.17 | (Cytop) |
| $R_1$ = ∞ | $D_1$ = 0.13 | (Water) |
| $R_2$ = ∞ | $D_2$ = 2.6321 | $N_1$ = 1.498308 |
| | $\nu_1$ = 65.03 | |
| $R_3$ = −2.02962 | $D_3$ = 0.1557 | |
| $R_4$ = −11.24135 | $D_4$ = 2.4515 | $N_2$ = 1.595508 |
| | $\nu_2$ = 39.21 | |
| $R_5$ = −5.57572 | $D_5$ = 0.1500 | |
| $R_6$ = 27.32755 | $D_6$ = 2.9722 | (CaF$_2$) |
| $R_7$ = −17.18697 | $D_7$ = 0.1500 | |
| $R_8$ = 10.24395 | $D_8$ = 5.1679 | (CaF$_2$) |
| $R_9$ = −7.23016 | $D_9$ = 1.2694 | $N_3$ = 1.613400 |
| | $\nu_3$ = 43.84 | |
| $R_{10}$ = 28.00100 | $D_{10}$ = 3.7777 | (CaF$_2$) |
| $R_{11}$ = −10.83247 | $D_{11}$ = 0.1500 | |
| $R_{12}$ = 19.76898 | $D_{12}$ = 2.3316 | (CaF$_2$) |
| $R_{13}$ = −51.72866 | $D_{13}$ = 0.1500 | |
| $R_{14}$ = 15.39146 | $D_{14}$ = 1.0000 | $N_4$ = 1.677900 |
| | $\nu_4$ = 55.34 | |
| $R_{15}$ = 3.94538 | $D_{15}$ = 5.6197 | (CaF$_2$) |
| $R_{16}$ = −7.85275 | $D_{16}$ = 1.0000 | $N_5$ = 1.650966 |
| | $\nu_5$ = 56.15 | |
| $R_{17}$ = −56.50527 | $F_{17}$ = 0.1500 | |
| $R_{18}$ = 4.31688 | $D_{18}$ = 4.7072 | (CaF$_2$) |
| $R_{19}$ = −9.37839 | $D_{19}$ = 2.0365 | $N_6$ = 1.521299 |
| | $\nu_6$ = 52.55 | |
| $R_{20}$ = −5.29731 | $D_{20}$ = 1.8728 | |
| $R_{21}$ = −3.20611 | $D_{21}$ = 1.2755 | $N_7$ = 1.622799 |
| | $\nu_7$ = 57.06 | |
| $R_{22}$ = −14.36277 | $D_{22}$ = 1.0000 | $N_8$ = 1.498303 |
| | $\nu_8$ = 65.03 | |
| $R_{23}$ = 8.75651 | $D_{23}$ = 4.5000 | |
| $R_{24}$ = −5.67991 | $D_{24}$ = 1.8386 | $N_9$ = 1.498308 |
| | $\nu_9$ = 65.03 | |
| $R_{25}$ = 26.25971 | $D_{25}$ = 2.0016 | $N_{10}$ = 1.595508 |
| | $\nu_{10}$ = 39.21 | |
| $R_{26}$ = −6.21018 | | |

In the above data items, signs $R_i$, $D_i$, $N_i$, and $\nu_i$ represent the curvature radius of each lens surface of an objective lens group, a distance between each adjacent pair of the lens surfaces of the objective lens group, the refractive index of each lens, and the Abbe number of each lens, respectively.

As can be seen in the Objective Lens Data Items shown above, the gap D1 between the cover slip 10 (Cytop) and the first surface (R2) of the objective lens 30 is filled with water 20. In other words, the objective lens 30 is a water-immersed type of lens.

In the above, a cover slip 10 having a thickness of 0.17 mm is used. FIG. 2 shows the intensity distribution of a dot image obtained by using the objective lens and the cover slip. Similarly, FIG. 3 shows the intensity distribution of a dot image obtained by use of the same objective lens as above and a cover slip with a thickness of 0.19 mm.

As is evident from comparison between FIGS. 2 and 3, when the cover slip is made of Cytop, the intensity distribution of a dot image will not greatly change if the thickness of the cover slip changes by about 0.02 mm. This means that the focusing accuracy is maintained substantially constant.

Figure 4:
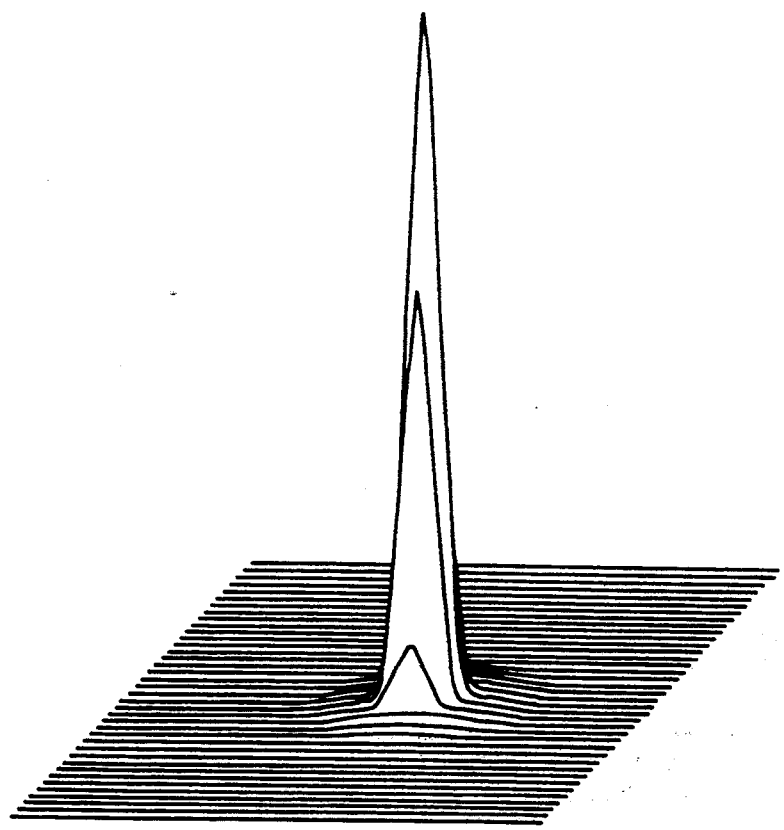
FIG. 4 represents the prior art and shows the intensity distribution of a dot image obtained by an objective lens, which has substantially the same specification as the objective lens of FIG. 1 and is designed for a usual cover slip, when the cover slip having a thickness of 0.17 mm is combined with the objective lens.
Figure 5:
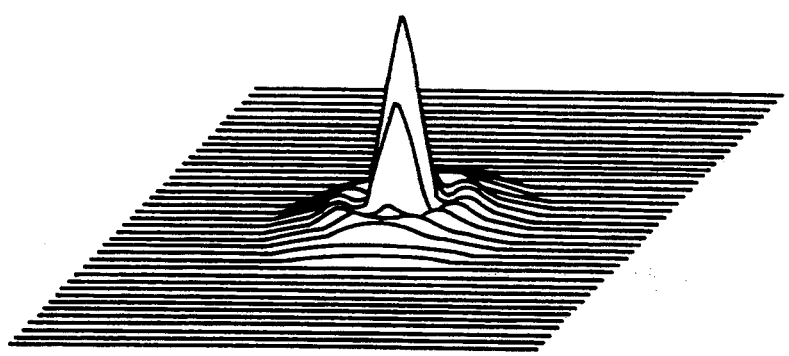
FIG. 5 also represents the prior art and shows the intensity distribution of a dot image obtained by an objective lens, which has substantially the same specification as the objective lens of FIG. 1 and is designed for a usual cover slip, when the cover slip having a thickness of 0.19 mm is combined with the objective lens.

FIGS. 4 and 5 are prepared to be compared with FIGS. 2 and 3, and show the intensity distribution of a dot image obtained by an objective lens substantially identical to the aforementioned objective lens designed for a usual cover slip. FIG. 4 shows a case using a cover slip with a thickness of 0.17 mm, and FIG. 5 shows a case using a cover slip with a thickness of 0.19 mm. As can be understood from FIGS. 4 and 5, the intensity of a dot image is greatly reduced when the thickness of the cover slip is deviated from a reference value of 0.17 mm.

As is described above, in the disclosed embodiment, deterioration in focusing accuracy can be reduced by using a cover slip made of Cytop. That is, such deterioration due to an error in the thickness of the cover slip can be minimized.

Further, a cover slip thinner than 0.17 mm is used to elongate the WD of the objective lens. In this case, if the cover slip is made of Cytop, no problem will occur as regards strength, differing from a usual slip.

When a sample is observed by use of an inverted microscope, the bottom of the Petri dish functions as a cover slip, and therefore the Petri dish itself is made of Cytop. In this case, it is desirable that the dish bottom has a thickness of about 0.25 mm to give strength thereto and prevent it from being broken at the time of manipulation. When the sample is observed by use of above objective lens using the dish, deterioration in focusing accuracy due to an error in the thickness of the dish bottom is minimized, and non-uniformity in thickness would cause no problem. Moreover, since Cytop is a resin soluble in a particular solvent, a complicated shape like a Petri dish can be produced easily.

In addition, the objective lens in the embodiment is designed to be used together with a cover slip made of Cytop which has a refractive index of 1.34 very close to that of water. Thus, a good image can be obtained even if a sample is observed in a state where the tip of the objective lens is immersed in a solution contained in a Petri dish.

As is explained above, the present invention can provide a cover slip, which has a high workability, and is suitable for a water-immersed objective lens for use in a biological microscope, and particularly suitable for a water-immersed objective lens having a high power and a high numerical aperture.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A cover slip for a microscope, comprising a transparent cover slip member made of fluorocarbon resin and which is used with a water-immersed objective lens of the microscope, and wherein the transparent cover slip member has a refractive index which is different from the refractive index of water by 0.02 or less.

2. The cover slip according to claim 1, wherein the fluorocarbon resin has a refractive index of substantially 1.34.

* * * * *